United States Patent
Call et al.

(10) Patent No.: US 9,454,981 B1
(45) Date of Patent: Sep. 27, 2016

(54) STRUCTURES AND METHODS FOR PARALLEL TESTING OF MULTIPLE READ HEADS IN TWO DIMENSIONAL MAGNETIC RECORDING SLIDERS

(71) Applicant: HGST Netherlands B.V., Amsterdam (NL)

(72) Inventors: David Ernest Call, Folsom, CA (US); Takayuki Fukumoto, Fujisawa (JP); Norman Macy Tecson Libunao, Laguna (PH)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/720,781

(22) Filed: May 23, 2015

(51) Int. Cl.
G11B 27/36 (2006.01)
G01R 33/12 (2006.01)
G11B 5/455 (2006.01)

(52) U.S. Cl.
CPC .................... G11B 5/455 (2013.01)

(58) Field of Classification Search
CPC ............... G11B 5/455; G11B 5/4555; G11B 2005/0016; G11B 5/3166; G11B 27/36; G11B 5/012; H01L 43/00; H01L 43/06; H01L 43/08; G01R 33/098; G01R 33/12; G01R 33/1215; G01R 33/1253; G01R 33/14; G01R 33/077; G01R 33/09; G01R 33/091; G01R 33/95; G01R 33/72

USPC ........ 360/31, 97.12, 135; 324/210, 262, 252, 324/234, 212, 750.03, 750.04
See application file for complete search history.

(56) References Cited

U.S. PATENT DOCUMENTS

| 5,517,111 | A | 5/1996 | Shelor |
| 5,821,746 | A | 10/1998 | Shelor |
| 6,587,805 | B2 | 7/2003 | Aslami |
| 7,550,967 | B1 | 6/2009 | Patland et al. |
| 7,960,968 | B2 * | 6/2011 | Kiyono ............ B82Y 25/00 29/603.09 |
| 8,653,824 | B1 | 2/2014 | Liu et al. |
| 8,704,511 | B2 | 4/2014 | Iben |

OTHER PUBLICATIONS http://ieeexplore.ieee.org/xpl/login.jsp?tp=&arnumber=5271995, accessed on Dec. 17, 2014.

* cited by examiner

Primary Examiner — Nabil Hindi

(57) ABSTRACT

Structures and methods are disclosed for parallel biasing and testing, at dc and high frequency, of two or more read heads within a two dimensional magnetic recording (TDMR) slider. Testing of heads comprises both conventional tests of the individual heads within the slider, as well as tests for interactions between the heads which are very closely spaced within the slider and thus may exhibit various magnetic, capacitive, ohmic, and stress-related interactions not seen in non-TDMR heads having only a single read head. Overall testing times are nearly the same as for single head testing.

27 Claims, 12 Drawing Sheets

STRUCTURES AND METHODS FOR PARALLEL TESTING OF MULTIPLE READ HEADS IN TWO DIMENSIONAL MAGNETIC RECORDING SLIDERS

TECHNICAL FIELD

The present invention relates to structures and methods for testing read heads for use in magnetic data storage systems such as hard disk drives or tape drives, and in particular to structures and methods for testing multiple read heads within sliders configured for two dimensional magnetic recording.

BACKGROUND

Data storage devices employ rotating data storage media such as hard disk drives or moving magnetic tape. In a hard drive, for example, data is written to the disk medium using a write head which generates a high localized magnetic field which aligns magnetic domains within the disk in one of two directions. In some cases, the magnetization direction is up or down relative to the plane of the disk (perpendicular magnetic recording, or PMR). In other cases, the magnetization direction is within the plane of the disk. In all cases, this data may then be read-out with a read head. The write and read heads are typically integrated within a single assembly. To achieve steadily increasing data storage densities (typically measured in bits/inch$^2$), which are now achieving levels near or beyond $10^{12}$ bits/in$^2$ (1 Tb/in$^2$), larger numbers of tracks are being written on each disk. Since disk diameters have remained relatively unchanged, this increase in the number of tracks has necessitated the use of narrower tracks, spaced more closely together. In the past, the read heads used to read data from these tracks were typically narrower than the track width so it was practical to achieve good signal-to-noise ratios (SNRs) using a single head to read the data from each track.

However, track widths are now becoming smaller than the widths of practical magnetic read heads (which are fabricated using methods similar to those in semiconductor manufacturing), with the result that a single read head may pick up increasing amounts of inter-track noise (i.e., the head senses data written on the two neighboring tracks to the track which the head is supposed to be reading). A technology called "Two Dimensional Magnetic Recording" (TDMR) is being applied to address this problem through the use of multiple read heads integrated within a single slider assembly. Another term for TDMR is Multiple-Input/Multiple-Output (MIMO) recording. A slider assembly may typically comprise one or more (for TDMR) read heads as well as a write coil, magnetic pole pieces, and in some embodiments thermal fly height control heaters, and optical waveguides or microwave sources.

The predominant sources of noise in the signal were found to be from adjacent track noise and track edge curvature distortion arising from fringing of the write head and from the fact that the slider does not move in a linear radial motion, but rather along an arc. In a TDMR slider, multiple read heads may be configured in various arrangements, either along-track one in front of the other, or side-to-side in a direction perpendicular to the track, or in some other arrangement—details of the configuration of the plurality of read heads within the TDMR slider are not part of the present invention.

With multiple read heads per slider, testing requirements during data storage system manufacturing become more complex. The difficult economics for the data storage device industry, however, require that testing times cannot substantially increase while still maintaining acceptable manufacturing costs. Thus it would be advantageous in a read head testing system to test TDMR sliders in approximately the same time as non-TDMR sliders are tested.

It would also be advantageous in a TDMR slider testing system to test multiple read heads simultaneously, thereby enabling the testing time for each read head within a TDMR slider to remain approximately the same as the testing time for the single read head in a non-TDMR slider.

It would be further advantageous in a TDMR read head testing system to measure any additional noise sources or read-signal coupling between read heads integrated within single sliders, and to perform this additional testing function with minimal increase in the overall testing time per slider.

It would also be advantageous to employ testing structures and methods for multiple read heads which are modifications of existing testing structures and methods employed for testing non-TDMR sliders, thereby minimizing the efforts required to implement TDMR slider testing in manufacturing.

It would also be advantageous to be able to independently set the bias conditions for each head being tested.

It would be further advantageous to configure the testing structures and methods for TDMR sliders to be compatible with also testing non-TDMR sliders, thereby avoiding the need for dedicated TDMR and dedicated non-TDMR slider testing systems within manufacturing.

Additionally, it would be advantageous to have the test structure be able to test sliders with either common lead or separate lead connections.

It would be advantageous to configure a testing system to be compatible with testing multiple read heads in non-TDMR sliders within a single row bar, thereby decreasing overall read head testing times and improving manufacturing efficiencies.

SUMMARY

Embodiments of the present invention provide structures and methods for testing multiple read heads within TDMR sliders simultaneously. This testing comprises determining the required bias currents/voltages for the individual read heads within single sliders, and other noise and performance characterization steps. The various measurements and performance characterizations of the individual read heads within a TDMR slider are familiar to those skilled in the art and are not part of the present invention. Due to possible inter-head coupling (magnetic, capacitive, ohmic, mechanical stresses, etc.) between the pluralities of read heads within each TDMR slider, additional measurements and performance characterizations are required for TDMR heads which are not required for non-TDMR sliders—these additional measurements and performance characterizations are part of embodiments of the present invention.

A goal of some embodiments is to test TDMR sliders in approximately the same time as non-TDMR sliders (with a single read head) are tested.

A goal of some embodiments is to test multiple read heads simultaneously, thereby enabling the testing time for each read head within a TDMR slider to remain approximately the same as the testing time for the single read head in a non-TDMR slider.

A goal of some embodiments is to measure any additional noise sources or read-signal coupling between read heads integrated within single sliders, and to perform this additional testing function with minimal increase in the overall testing time per slider.

A goal of some embodiments is to employ testing structures and methods for multiple read heads which are modifications of existing testing structures and methods employed for testing non-TDMR sliders, thereby minimizing the efforts required to implement TDMR slider testing in manufacturing.

A goal of some embodiments is to configure the testing structures and methods for TDMR sliders to be compatible with also testing non-TDMR sliders, thereby avoiding the need for dedicated TDMR and dedicated non-TDMR slider testing systems within manufacturing.

A goal of some embodiments is to be able to independently set the bias conditions for each head being tested.

A goal of some embodiments is to have the test structure be able to test sliders with either common lead or separate lead connections.

A goal of some embodiments is to have the testing system be able to test multiple read heads in non-TDMR sliders within a single row bar.

DETAILED DESCRIPTION

Embodiments can provide one or more advantages over previous methods for testing read heads in sliders designed for application to two-dimensional magnetic recording (TDMR). Not all embodiments may provide all the benefits. The embodiments will be described with respect to these benefits, but these embodiments are not intended to be limiting. Various modifications, alternatives, and equivalents fall within the spirit and scope of the embodiments herein and as defined in the claims.

Testing Configuration for TDMR Read Heads

Figure 1:
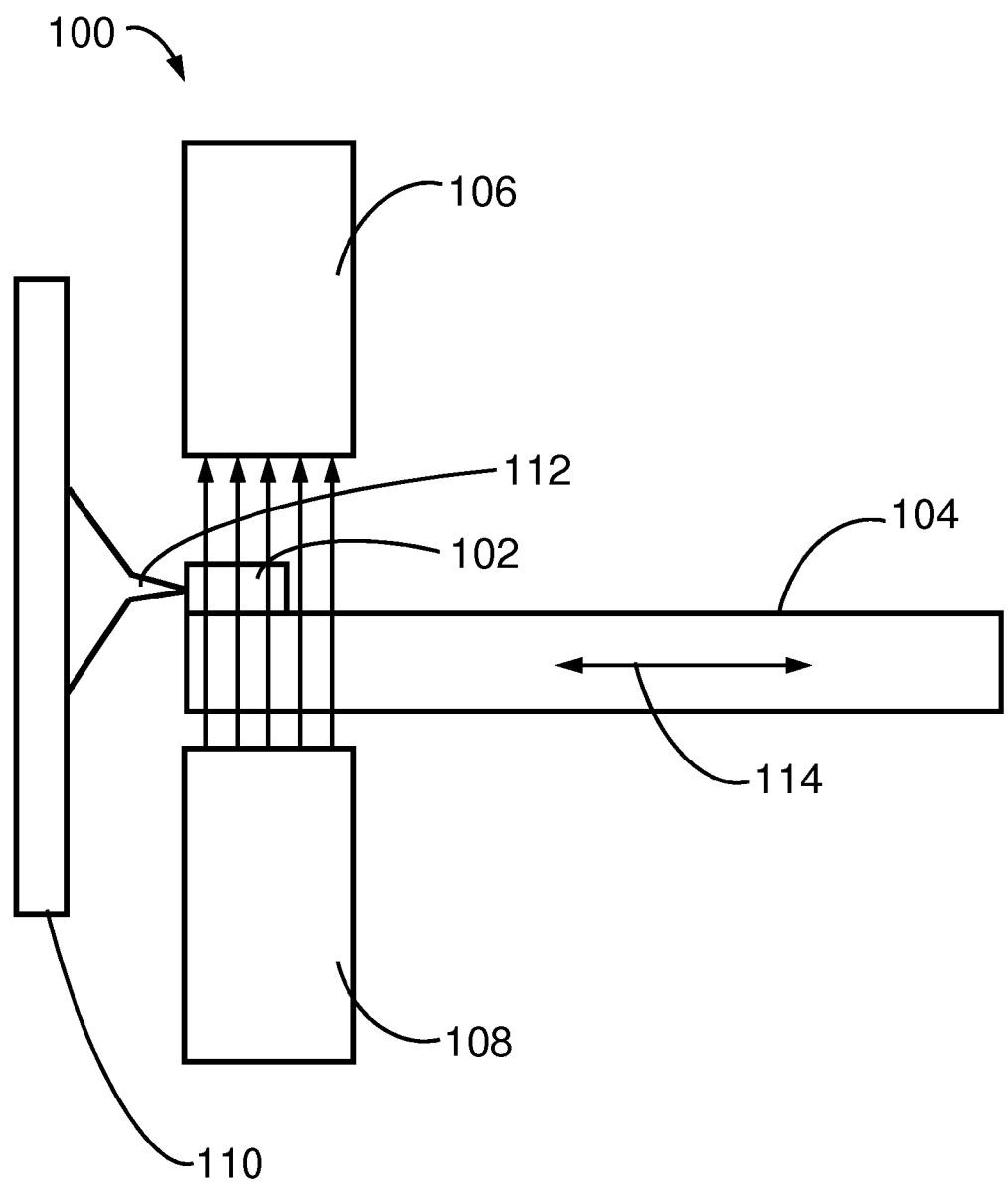
FIG. 1 is a schematic diagram of a testing configuration for TDMR read heads.

FIG. 1 is a schematic diagram 100 of a testing configuration for TDMR read heads. TDMR read heads may be employed in hard disk drives, tape drives, or similar magnetic data storage systems. A slider 102 is shown affixed to a movable nest 104. In some testing configurations, slider 102 may be one of a multiplicity N of sliders, wherein each of the N sliders would comprise a plurality M of read heads, as described in the Background section above for TDMR technology. At least three different testing configurations for sliders are possible within the scope of the invention:

1) Testing of single sliders, mounted in a "nest" (as shown in FIG. 1)
2) Testing of a single bar, sliced out of a wafer, which may contain up to 60 sliders, and
3) Testing of Head Gimbal Assemblies (HGAs), which are sliders already attached to a suspension.

The plurality of read heads in each slider may be configured in a common lead circuit with one common connection (i.e., a single pad) among the M read heads within a single slider, or the M read heads may be configured in a separate lead circuit wherein each read head is connected to two pads separate from the pads for the other M−1 read heads in the slider.

For testing, the slider is connected to a probe card 110 by a plurality of probe wires 112, one per pad on the slider being tested. In addition to the probe wires 112 connecting to the read heads, in some embodiments there may be additional probe wires connecting to additional pads to control the write coil, thermal fly height control heaters, etc. In some embodiments, the write coil may be energized to exert a magnetic stress on the read heads during testing. In some embodiments, the thermal fly height control heater may be energized to apply thermal stress to the read heads during testing. Two magnetic poles 106 and 108 are energized by a magnetic coil (not shown) to generate a transverse magnetic field as shown by the arrows—this magnetic field simulates the magnetic field which will be induced at the read heads by the magnetic media when the slider has been assembled into a hard disk drive. The polarity and strength of this magnetic field are determined by the current in the magnet coil which is regulated by the test system controller (not shown).

Figure 2:
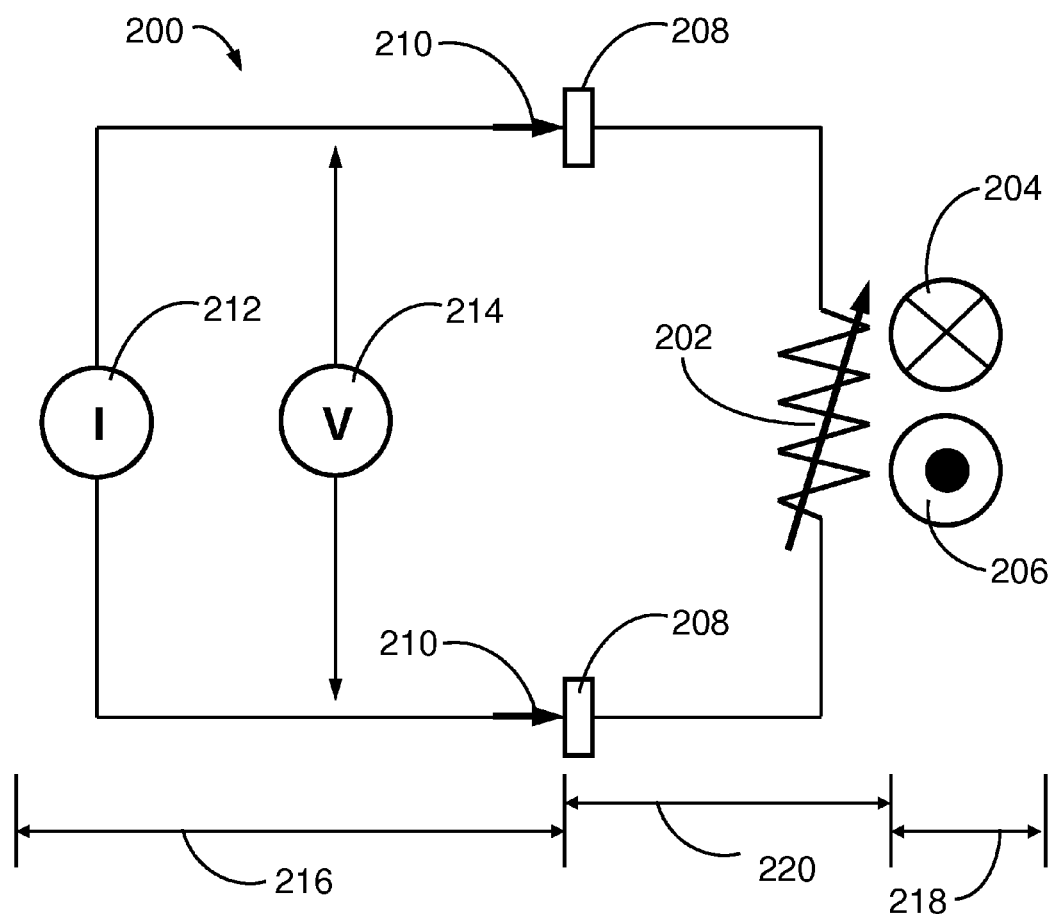
FIG. 2 is an electrical model for the testing configuration in FIG. 1.

After testing of slider 102 is complete, nest 104 would be moved as shown schematically by arrows 114 to position another slider at the probe wires 112. Arrows 114 represent a multi-step motion, typically consisting of the steps of: 1) motion away from the probe card, then 2) motion perpendicular to the plane of figure (parallel to the probe card), and finally 3) motion back towards the probe card until the probe wires are in contact with pads in the next slider. The flowchart in FIG. 10 describes this overall testing procedure for a multiplicity N of sliders contained in the nest 104. FIG. 2 is an electrical model 200 for the testing configuration in FIG. 1. Section 216 represents the testing system, including the current monitor 212, the voltage monitor 214 and probe wires 210. Section 218 represents the magnetic field generated between the two pole pieces 106 and 108 in FIG. 1, passing through the slider to simulate the magnetic fields induced by the magnetic storage medium above which the slider will "fly" during normal operation within a data storage system such as a hard disk drive or tape drive. Section 220 represents the slider under test, comprising slider pads 208 (contacted by probe wires 210) and the read head 202, represented here by a variable resistance. As is well known in the art, and not part of the invention, the resistance of a magneto-resistive read head is a function of the local magnetic field at the head, represented here by the arrow through resistor 202. By applying a bias current 212 flowing through read head 202, a time-varying voltage 214 is generated by application of Ohm's Law—this voltage then generates the signal from the read head, either during read head testing, or during actual operation of the read head within a data storage device.

Figure 3:
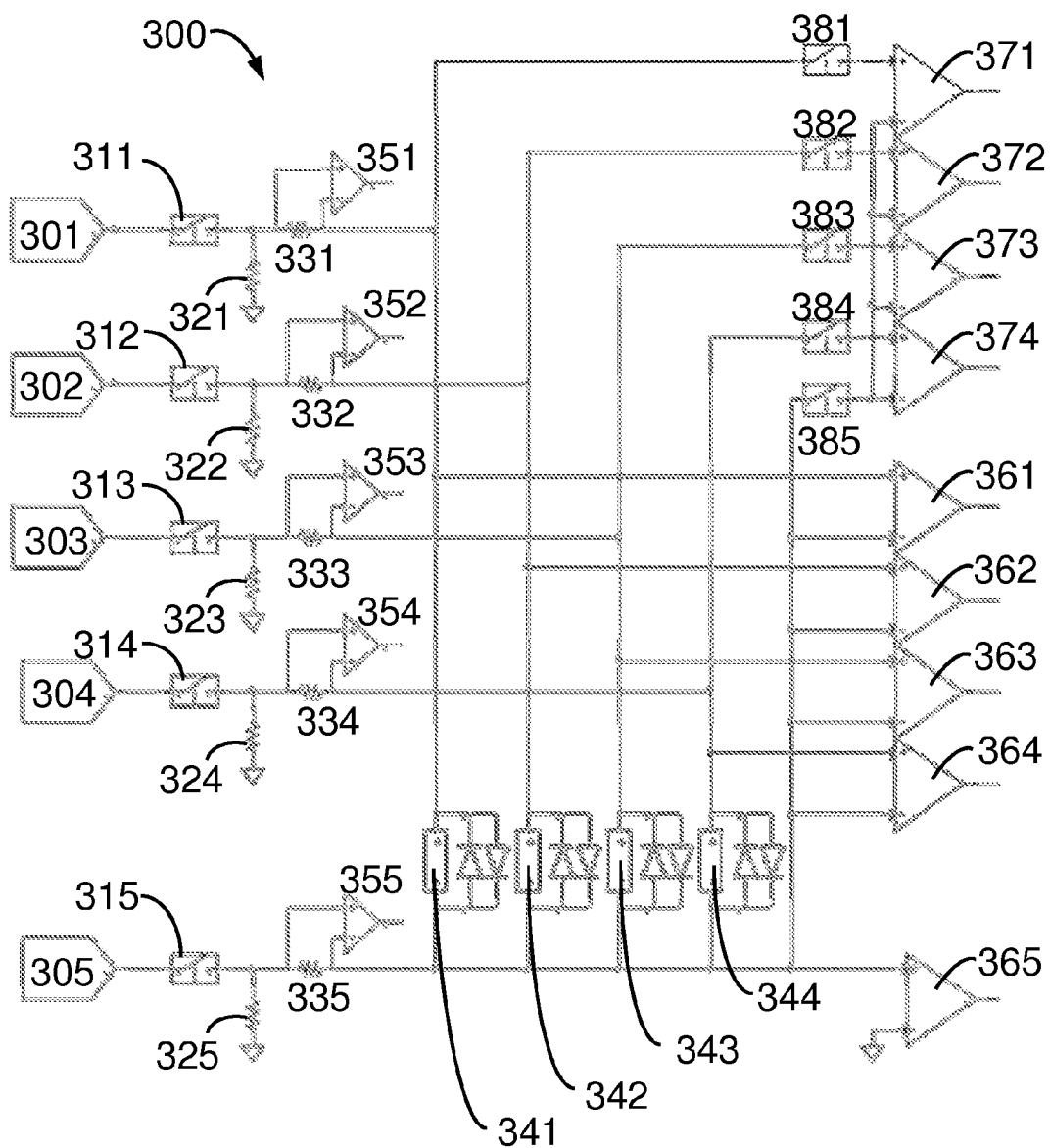
FIG. 3 is a schematic diagram of a circuit for parallel testing of multiple read heads in a TDMR slider in a common lead configuration during DAC set-up.
Figure 7:
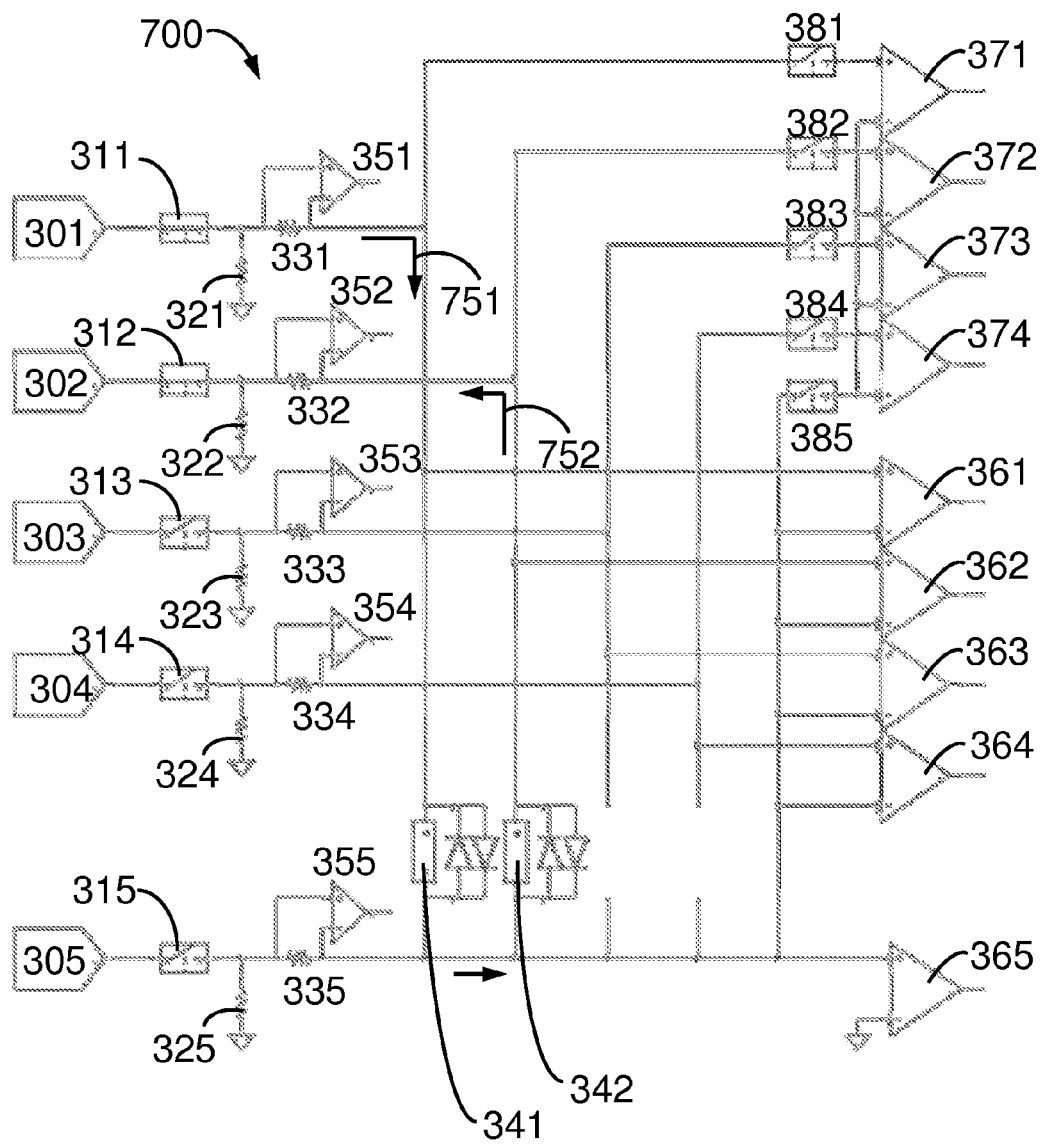
FIG. 7 is the circuit from FIG. 3 during setting of the bias and dc testing of two read heads in a slider in a series configuration.

Parallel Testing of Multiple Read Heads in a Slider Wired in a Common Lead Configuration FIGS. 3-5 show a circuit for simultaneous testing of up to four read heads within a single TDMR slider (or a single read head within a non-TDMR slider) in various operational modes selected by the opening and closing of relays as shown in FIGS. 4 and 5. FIG. 7 (see section below) shows this same circuit operating in a series mode, testing two sliders simultaneously.

Before initiating testing of read heads, in some embodiments the leakage currents through the ESD diodes (the pairs of diodes seen in FIG. 3 in parallel with each read head 341-344) may be measured. Prior to connecting the probe card wires to the pads on a slider, the ESD diode leakage currents may be measured using the following procedure:

1) Close relays 311 and 315, open relays 312-314, 381-385.
2) Ramp DAC 301 over a range of voltages corresponding to typical read head bias voltages and record the current measured by amplifier 351.
3) Close relays 312 and 315, and open relays 311, 313, 314, 381-385.
4) Ramp DAC 302 over a range of voltages corresponding to typical read head bias voltages and record the current measured by amplifier 352.
5) Close relays 313 and 315, and open relays 311, 312, 314, 381-385.
6) Ramp DAC 303 over a range of voltages corresponding to typical read head bias voltages and record the current measured by amplifier 353.
7) Close relays 314 and 315, and open relays 311-313, 381-385.
8) Ramp DAC 304 over a range of voltages corresponding to typical read head bias voltages and record the current measured by amplifier 354.

The stored table of diode leakage currents as a function of the voltage across the diodes may then be used to account for the diode leakage current during all dc bias settings and dc performance characterization steps below. The above procedure for measuring ESD diode leakage currents may in some embodiments be applied to single read heads in either TDMR sliders, or non-TDMR sliders.

FIG. 3 is a schematic diagram 300 of a circuit for parallel testing of multiple read heads in a TDMR slider in a common lead configuration during digital-to-analog converter (DAC) set-up. This figure corresponds to block 602 in FIG. 6—where relays 311-315 are open, disconnecting the outputs of the five DACs 301-305 from the read heads 341-344 (within a single TDMR slider) to be tested. Also, relays 381-385 are open, disconnecting the high frequency preamps used for noise measurements (see FIGS. 4B, 5B and 7). Because relays 311-315 are open, no currents can flow due to the output voltages of the DACs 301-305, and thus no currents are shown here (compare with FIGS. 4, 5, and 7). With no currents flowing, there will be no voltage drops across any of resistors 321-325, 331-335, or magneto-resistive sensors (GMR or TMR—which appear electrically as resistors) 341-344. To protect the sensitive read heads 341-344 from electrostatic discharge damage, the function of resistors 321-325 (typically with resistances in the 1 Mohm range—adequate to bleed off accumulated charges, but too large to have any significant effect on the testing system operation) is to drain any charges to ground, thereby protecting the heads against damage when the circuits are disconnected. The output voltages of DACs 301-305 are set to 0 V, as determined by the binary input signals to each of DACs 301-305. By zeroing out the DAC voltages before closing any of relays 311-315, any possible impulse voltage and/or current stresses arising from rapid current spikes on read heads 341-344 during relay closing are minimized. The outputs of amplifiers 361-365 should also be zero since their positive and negative inputs will be equal in the absence of currents flowing through read heads 341-344. Amplifiers 351-355 are connected across current sense resistors 331-335, respectively—the outputs of amplifiers 351-355 measure the currents flowing in both the sense resistors 331-335 as well as the read heads 341-344, as discussed in FIG. 4, below.

Set-Up and Testing of a Single Read Head

Figure 4A:
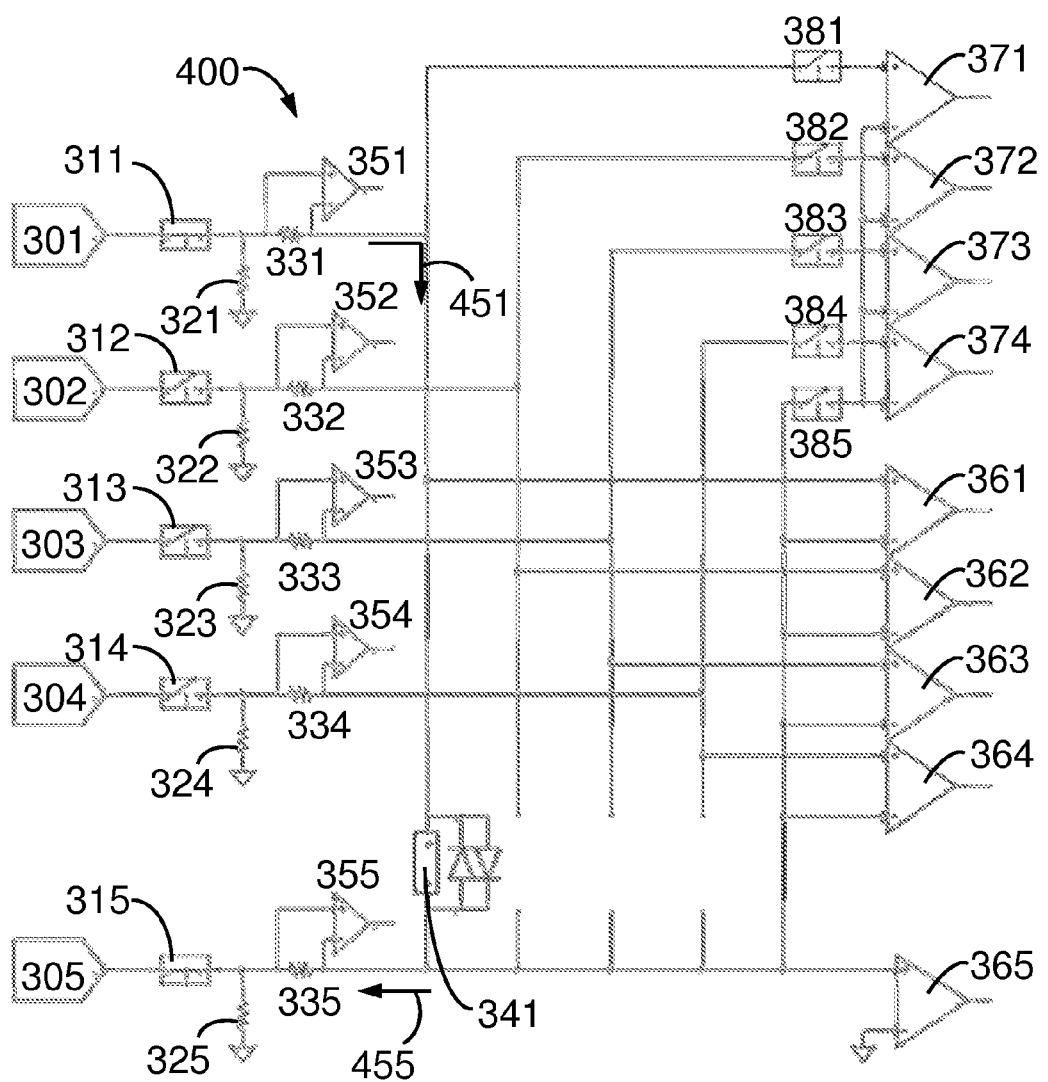
FIG. 4A is the circuit from FIG. 3 during setting of the bias and dc testing on a single read head in a slider.
Figure 4B:
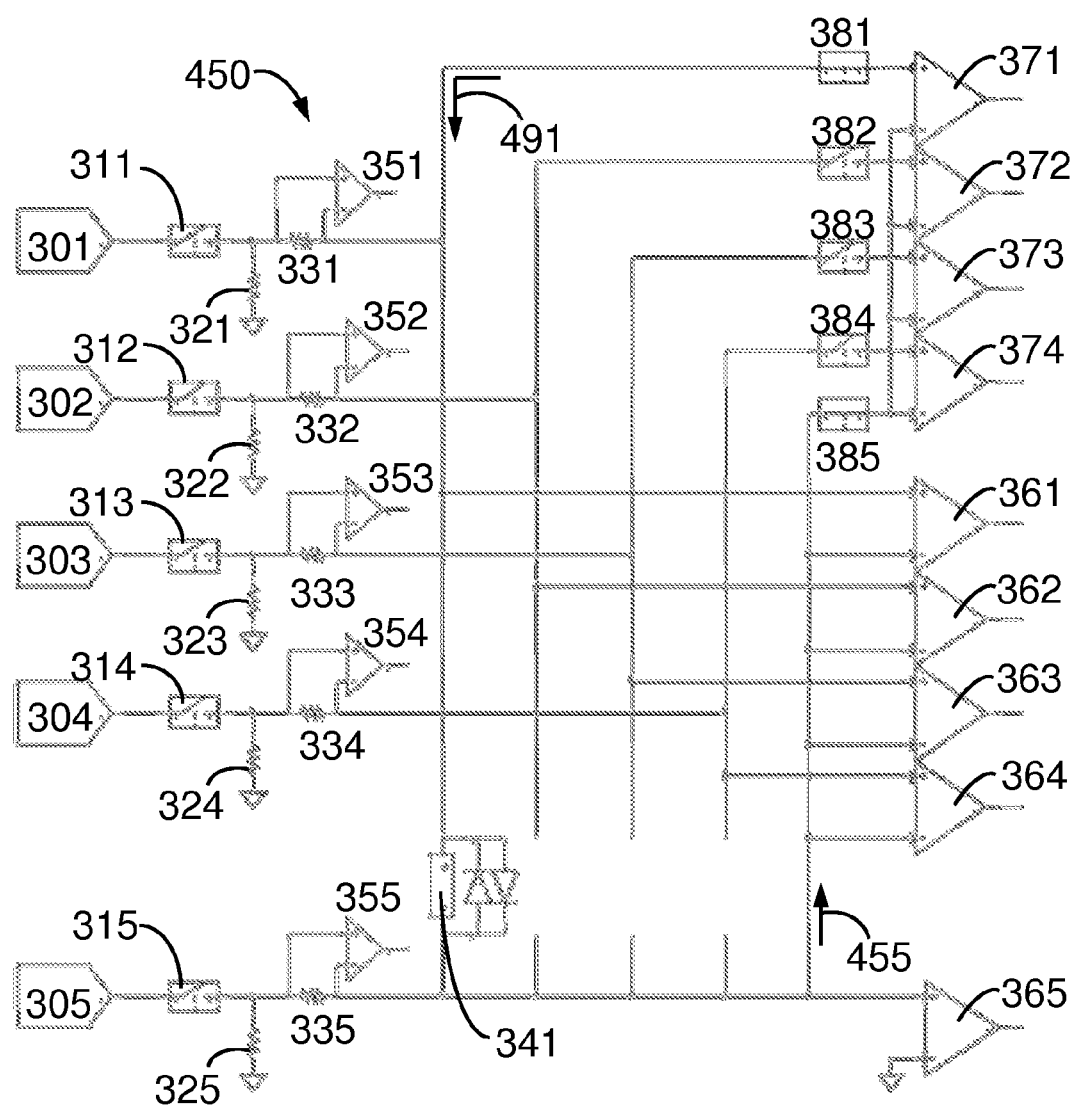
FIG. 4B is the circuit from FIG. 3 during noise testing of a single read head in a slider.

FIGS. 4A and 4B illustrate two operating modes of the circuit in FIG. 3, which essentially comprises two combined test circuits: 1) a dc set-up and test circuit employing DACs 301-304 to apply either voltage or current biases to read heads 341-344, and 2) a high frequency test circuit employing preamps 371-374 to measure noise and instabilities of the heads 341-344. FIG. 4A shows dc set-up and testing, while FIG. 4B illustrates high frequency testing. In both cases, a single read head 341 is being tested. In FIG. 4A, the testing system is configured for setting the dc bias on read head 341 and then to perform dc testing, such as 1) resistance measurements, 2) quasi amplitude and asymmetry, and 3) the transfer curve and kink. In FIG. 4B, the testing system is configured for high frequency noise and instability measurements. Details of both dc and high frequency testing are discussed further in the section below on "Procedure for Sequentially Testing Multiple Sliders".

FIG. 4A shows the circuit 400 from FIG. 3 during bias set up and dc testing of a single read head 341 in a slider. Before examining the parallel testing of multiple (four) read heads in FIGS. 5A and 5B, the testing of a single read head is first illustrated here. This may correspond either to a single read head in a TDMR slider, or to the only read head in a non-TDMR slider—thus embodiments of the invention are capable of testing both multiple read head TDMR sliders, as well as non-TDMR sliders—this ensures backwards compatibility in a manufacturing test environment. Relay 311 is closed, allowing currents to flow in resistors 321 and 331, as well as through read head 341. Specifically, current 451 flows through the current-sense resistor 331 and then through read head 341 with resistance R (341) as shown. Amplifier 351 is connected across sense resistor 331 to measure the voltage drop and thus the current flowing 451 (since the resistance of resistor 331 is known). Since no currents flow into the positive and negative inputs of amplifiers 361-365, the currents through read heads 341-344 and ESD (electro-static discharge) diodes (leakage current) are always equal to the currents through sense resistors 331-334, respectively. The leakage currents through the ESD diodes induce non-linearities in measurements of the resistivities of read heads 341-344 which must be accounted for. The current 455 through sense resistor 335 is measured by amplifier 355 and is always equal to:

$$I(335) = I(331) + I(332) + I(333) + I(334)$$

Current 455 [I(455)] flowing through resistor 335 must equal I(451) in this configuration of testing a single read head. Relays 312-314 remain open (from FIG. 3 and block 602 in FIG. 6) since there are no read heads connected to these other three individual test circuits. Also, relays 381-385 (connecting to high frequency preamps 371-374) remain open since in this mode we are not making high frequency measurements. The voltage output from amplifier 361 indicates the voltage drop due to the current 451 flowing through read head 341, by applying Ohm's Law using the value of current 451, which was measured by amplifier 351. The output voltages of amplifiers 362-364 are unimportant since there are no read heads connected to their corresponding test circuits.

FIG. 4B shows the circuit from FIG. 3 which was illustrated in FIG. 4A, except that the circuit 450 is now configured to perform high frequency noise and instability testing. Relays 311 and 315 are now open, and relays 381 and 385 have been closed, connecting both inputs of high frequency preamp 371 to read head 341. Note that now the bias current I(491)=I(455) [which can be measured by amplifier 361] for read head 341 is supplied by preamp 371.

Set-Up and Testing of a Four Read Heads in Parallel

Figure 5A:
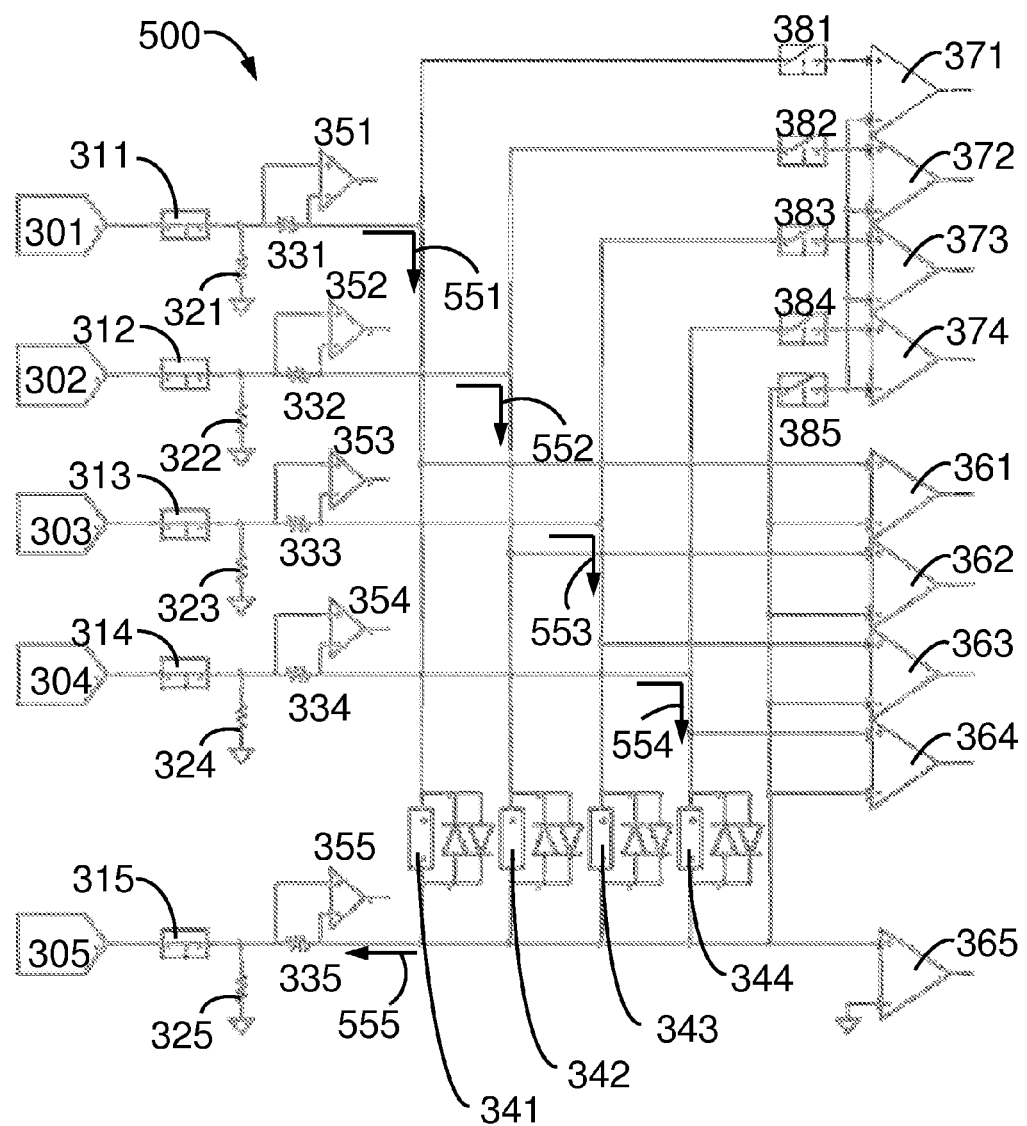
FIG. 5A is the circuit from FIG. 3 during parallel setting of the bias and dc testing of four read heads in a slider.
Figure 5B:
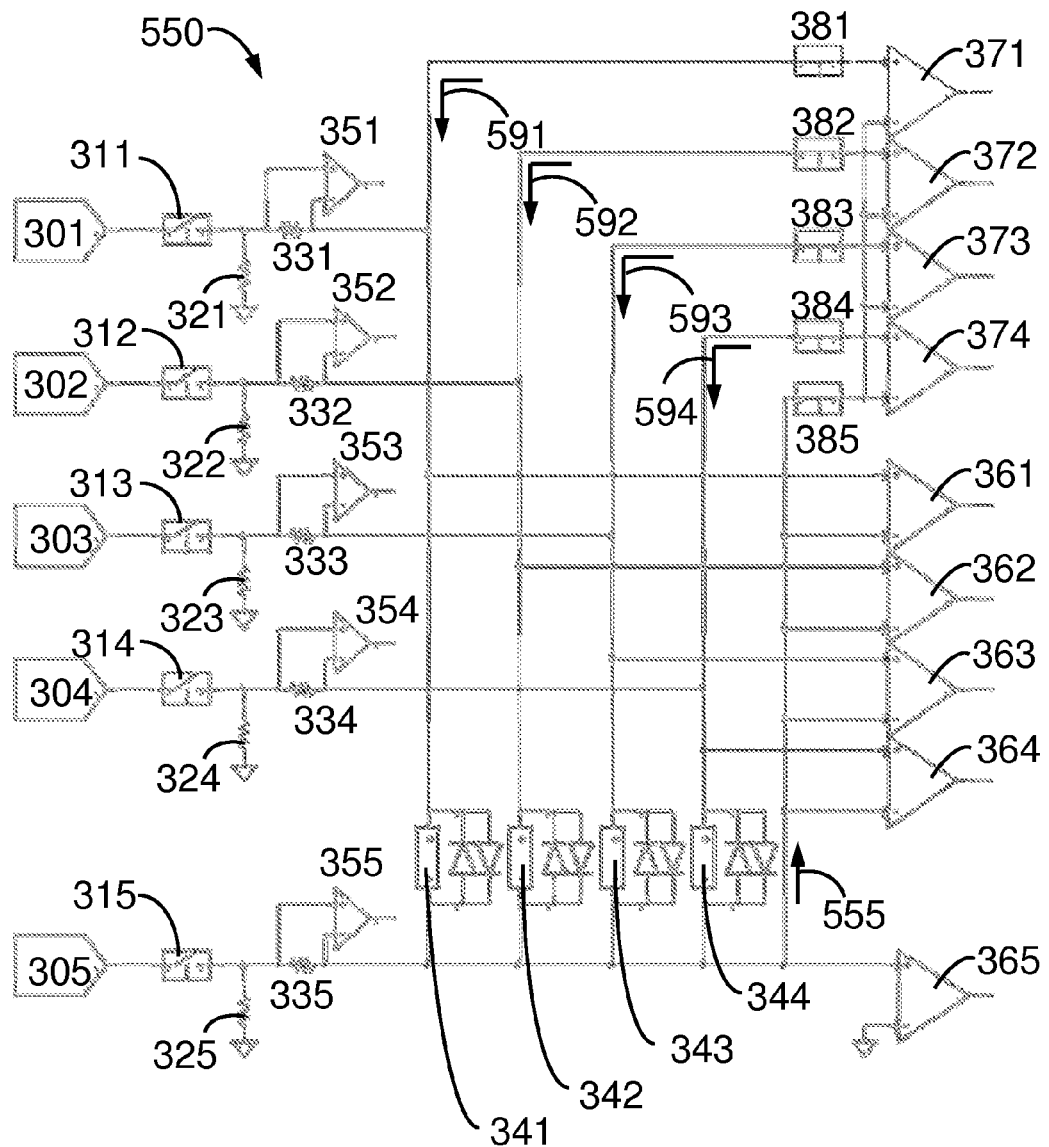
FIG. 5B is the circuit from FIG. 3 during parallel noise testing of four read heads in a slider.

FIGS. 5A and 5B are similar to FIGS. 4A and 4B, respectively, except now the parallel bias set-up, dc testing, and high frequency testing of four read heads is illustrated.

FIG. 5A is the circuit 500 from FIG. 3 during parallel bias set-up and dc testing of four read heads 341-344 in a TDMR slider. Now, according to block 604 in FIG. 6, all of relays 311-315 are closed allowing currents 551-554 to flow through sense resistors 331-334 and magneto-resistive read heads 341-344, respectively. Current 555 is the summation of currents 551-554, as indicated in the formula below.

There are two alternative approaches to setting the bias on the read heads:

1) Bias Current—in this approach, the target current flowing through the read head (e.g., current 551 through read head 341) is specified, and the output of DAC 301 is adjusted to achieve the desired current. Typical bias currents may be around 50 μA. Since the actual resistance of read head 341 is not known exactly, a multiple step procedure (see FIG. 8) is followed:
   a. The output of DAC 301 [V(301)] is set based on the assumption that head 341 has a resistance (Rinit) towards the lower end of the nominal resistance range. This ensures that if the head happens to have a low resistance that it will not inadvertently be damaged by overstressing, which might occur if a higher current were to flow through the head.
   b. The voltage drop across sense resistor 331 (measured by amplifier 351) is used to measure the current 551.
   c. Amplifier 361 measures the voltage drop, V(341), across head 341, and Ohm's law then gives the resistance of head 341: R(341)=V(341)/I(551).
   d. If the current I(551) differs from the desired bias current, the output of DAC 301 is adjusted to correct the bias current. This is done by adjusting DAC 301 to a new value of DAC(updated)=[(Bias target)/(Bias measured)]*DAC (current)

2) Bias Voltage—in this approach, the voltage across the read head [V(341)] is specified. Typical bias voltages may be around 125 mV with typical head resistance in the range of 1 kohm. Again, a multiple step procedure is followed:
   a. The output of DAC 301 is set based on the assumption that head 341 has a resistance [R(341 init)=Rinit] towards the lower end of the nominal resistance range. This ensures that if the head happens to have a low resistance that it will not inadvertently be damaged by overstressing, which might occur if a higher current were to flow through the head.
   b. The voltage drop across head 341 is measured by amplifier 361.
   c. If the voltage V(341) differs from the desired bias voltage, the output of DAC 301 is adjusted to correct the bias voltage. This is done by adjusting DAC to a new value of DAC(updated)=[(Bias target)/(Bias measured)]*DAC (current)

For the case of setting up four bias currents [I(551) to I(554)] in parallel, the voltages on DACs 301-304 may be set according to the equations [where R(341 init)=Rinit, . . . , R(344 init)=Rinit, and Rinit is near the lower end of the expected resistance range for read heads]:

$$V(301)=I(551)I(bias551\ target)[R(331)+R(341\ init)]+Vref$$

$$V(302)=I(552)I(bias552\ target)[R(332)+R(342\ init)]+Vref$$

$$V(303)=I(553)I(bias553\ target)[R(333)+R(343\ init)]+Vref$$

$$V(304)=I(554)I(bias554\ target)[R(334)+R(344\ init)]+Vref$$

$$I(555)=I(551)+I(552)+I(553)+I(554)=I(bias551\ target)+I(bias552\ target)+I(bias553\ target)+I(bias554\ target).$$

$$V(305)=-I(555)R(335)+Vref$$

It is preferred that the sensors are biased symmetrically around 0 V (i.e., ground potential), thus we apply the additional constraint:

$$Vref=-0.5V(bias\ average)$$

$$V(bias\ average)==[I(551\ target)R(341\ init)+I(552\ target)R(342\ init)+I(553\ target)R(343\ init)+I(554\ init)T(344\ init)]/4$$

For the case of setting up four bias voltages [V(341) to V(344)] in parallel, the voltages on DACs 301-304 [V(301)-V(304)] may be set according to these equations [where Rinit=the initial assumption for the resistances R(341)-R(344) of the read heads 341-344, and where V(341 target) is the desired voltage bias for read head 341, etc.]:

$$V(301)=[V(341\ target)/R(341\ init)]*[R(331)+R(341\ init)]+Vref$$

$$V(302)=[V(342\ target)/R(342\ init)]*[R(332)+R(342\ init)]+Vref$$

$$V(303)=[V(343\ target)/R(343\ init)]*[R(333)+R(343\ init)]+Vref$$

$$V(304)=[V(344\ target)/R(344\ init)]*[R(334)+R(344\ init)]+Vref$$

$$I(555)=V(341\ target)/R(341\ init)+V(342\ target)/R(342\ init)+V(343\ target)/R(343\ init)+V(344\ target)/R(344\ init)$$

$$V(DAC\ 305)=-I(555)R(335)+Vref$$

It is preferred that the sensors are biased symmetrically around 0 V (i.e., ground potential), thus we apply the additional constraint:

$$Vref=-0.5\ V(bias\ average)$$

$$V(bias\ average)=[V(341\ target)+V(342\ target)+V(R43\ target)+V(344\ target)]/4$$

In general, current sense resistors 331-335 may have the same value, typically in the range of 1 to 2 kohms. Charge bleed-off resistors 321-325 also will have the same value, typically approximately 1 Mohm.

The output voltages of amplifiers 361-364 represent the Ohmic voltage drops across read heads 341-344, respectively. These voltages represent the output signals from the four read heads 341-344 being measured simultaneously by means of the four parallel voltage outputs from amplifiers 361-364.

Other testing configurations for two or three read heads are also possible with the appropriate closing and opening of relays 311-314.

Once the bias currents or voltages for read heads 341-344 have been set by the above procedures, dc testing may be performed, including 1) resistance measurements, 2) quasi amplitude and asymmetry, and 3) the transfer curve and kink—details of these procedures are provided in the section "Procedure for Sequentially Testing Multiple Sliders", below.

FIG. 5B shows the circuit from FIG. 3 which was illustrated in FIG. 5A, except that the circuit 550 is now configured to perform high frequency noise and instability testing. Relays 311-315 are open, and relays 381-385 have been closed, connecting high frequency preamps 371-374 to read heads 341-344, respectively. Note that now the bias currents for read heads 341-344 are supplied by preamps 371-374 as illustrated by currents 591-594, respectively, shown coming through relays 381-384 from preamps 371-374. Current 555 is the combination of currents 591-594.

Algorithm for Setting the Bias on Multiple Read Heads Simultaneously

Figure 6:
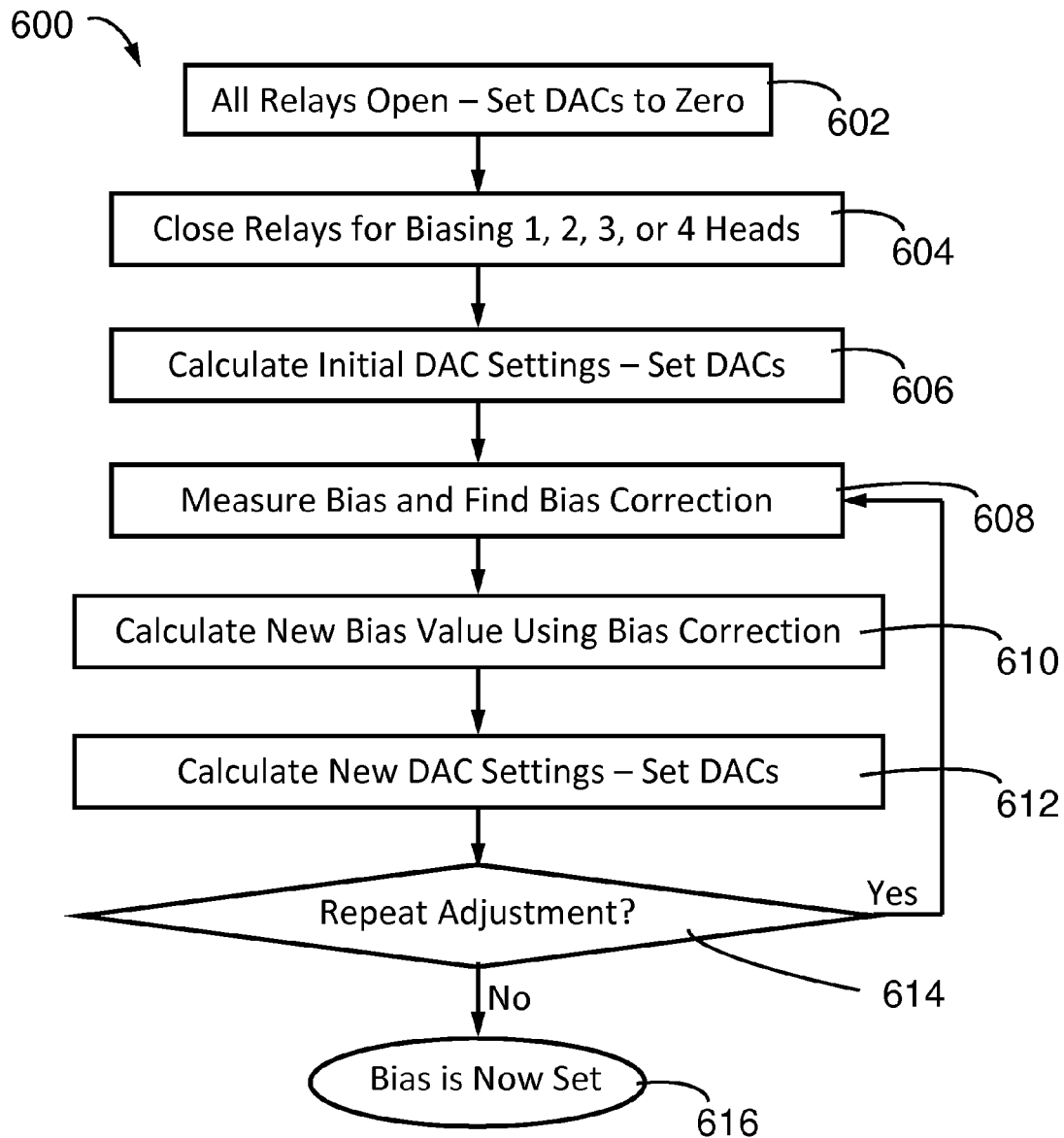
FIG. 6 is a flow chart of an algorithm for setting the bias on multiple read heads simultaneously.

FIG. 6 is a flow chart 600 of an algorithm for setting the bias on multiple read heads simultaneously. Block 602 is illustrated in FIG. 3, where the output voltages of DACs 301-305 are all initialized to 0 V.

In block 604, relays are left open or closed depending on the various read heads to be tested. Thus if there is a read head 341 connected to the probe card, then relay 311 will be closed. If there is a read head 342 connected, relay 312 will be closed. Similarly for read heads 343 and 344, with respect to relays 313 and 314. Any combination of read heads is allowable, from one head (as in FIG. 4) up to four heads (as in FIG. 5). Read heads do not have to be sequential—some read head test locations out of the set of four (341-344) may be skipped or omitted—e.g., heads 341 and 344 may be tested while heads 342 and 343 are absent.

In block 606, the initial DAC settings are calculated and then applied to the inputs of DACs 301-305. The equations in the previous section for V(301)-V(305) are used, with the initial values for R(331)-R(335) and the assumed initial values for R(341)-R(344) are at the low end of the expected head resistance range (as discussed above) unless the actual values for R(341)-R(344) have been measured previously.

Next, in block 608, the bias values (currents or voltages) for each read head are measured. Due to manufacturing tolerances, in general these bias values will differ from the desired ("target") values. An adjustment factor is then calculated:

$$\mathrm{Adj}(n) = (\text{Bias Target})/(\text{Bias Measured})$$

Where n=341 to 344, corresponding to the particular read head, and the "Bias Target" and "Bias Measured" may be either voltages or currents. The Biases applied to each read head are then multiplied by the Adj(n) factors in block 610, and the output settings of DACs 301 to 305 are recalculated in block 612 and applied to the DAC digital inputs.

Typically, when the bias correction factors Adj(n) are less than ±20%, only a single bias adjustment cycle is required, and block 614 will respond with a "No" leading to completion block 616. In cases of larger corrections, a second cycle may be desirable, so that block 614 will respond with a "Yes", leading back to block 608 for a remeasurement of the bias and the calculation of modified adjustment factors Adj(n). For all passes through the loop after the first pass, the same values for R(341 init)-R(344 init) are used as in block 606.

Testing of Two Read Heads in a Slider in a Series Configuration

FIG. 7 is similar to FIG. 4A, except now the set-up, dc testing, and high frequency testing of two read heads in a series configuration is illustrated. FIG. 7 is the circuit 700 from FIG. 3 during set-up and dc testing of two read heads 341 and 342 in a series configuration. In this operating mode, the reference circuit is not used, and instead current 751 flows through current sense resistor 331 (where the current is measured by amplifier 351), then through read heads 341 and 342 (in series) and finally through current sense resistor 332 (where it is labelled current 752 which is equal in magnitude but opposite in polarity to current 751 and is measured by amplifier 352). This testing configuration enables the measurement of interactions between the two heads 341 and 342 which are in close physical proximity within the slider and thus may have correlated noise and signal coupling or signal shunting. Relays 381-385 remain open to isolate the high frequency preamps from the read heads.

Algorithm for Setting the Bias on Two Read Heads Simultaneously

Figure 8:
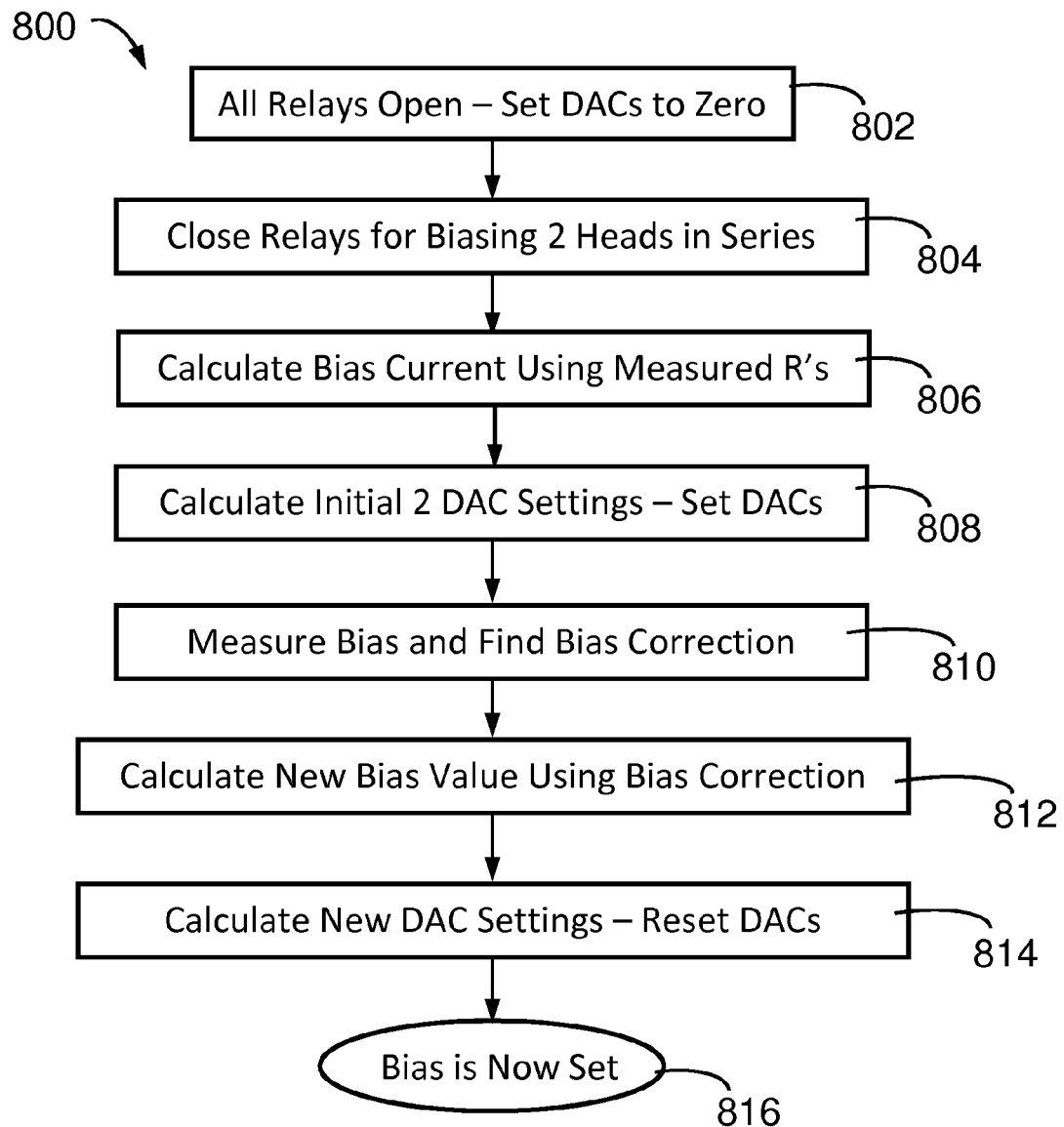
FIG. 8 is a flow chart of an algorithm for setting the bias on two read heads simultaneously in a series configuration.

FIG. 8 is a flow chart 800 of an algorithm for setting the bias on two read heads simultaneously in a series configuration, as shown in FIG. 7. Block 802 is illustrated in FIG. 3, where the output voltages of DACs 301-305 are all initialized to 0 V. Series measurements are assumed to be performed after the read head resistances have already been measured, for example using the procedure of FIG. 6.

Referring to FIG. 7, in block 804, relays 313-315 and 381-385 are left open while relays 311 and 312 are closed. The bias current is calculated in block 806:

$$I(\text{bias}) = V(\text{bias total})/[R(341) + R(342)]$$

where we use previously-measured values for R(341) and R(342). If the head resistances have not been measured, then the assumed values of R(341 init)=R(342 init)=Rinit would be used instead, where Rinit is chosen near the lower end of the expected resistance range for the read heads (approximately 1 kohm) to avoid possible damage to the heads due to overstressing in the event that their resistances are below nominal.

In block 808, the initial settings for DACs 301 and 302 are calculated:

$$V(\text{DAC } 301) = 0.5 I(\text{bias})(R(331) + R(332) + R(341) + R(342))$$

$$V(\text{DAC } 302) = -V(\text{DAC } 301)$$

and then applied to the inputs of DACs 301-302.

Next, in block 810, the bias values (currents or voltages) for read heads 341 and 342 are measured. Due to manufacturing tolerances, in general these bias values will differ from the desired ("target") values. A adjustment factor is then calculated:

$$\mathrm{Adj}(n) = (\text{Bias target})/(\text{Bias measured})$$

Where n=341 and 342, corresponding to two read heads being tested. The Biases applied to each read head are then multiplied by the Adj(n) factors in block 812, and the output settings of DACs 301 and 302 are recalculated in block 814 and applied to the DAC digital inputs. Block 816 is the completion block—typically only one cycle is required for this procedure, like the case in FIG. 6. The bias currents (voltages) are multiplied by Adj(n) and the same values are used for R(331), R(332), R(341), and R(342) as in block 806.

Parallel Testing of Multiple Read Heads in a Separate Lead Configuration

Figure 9:
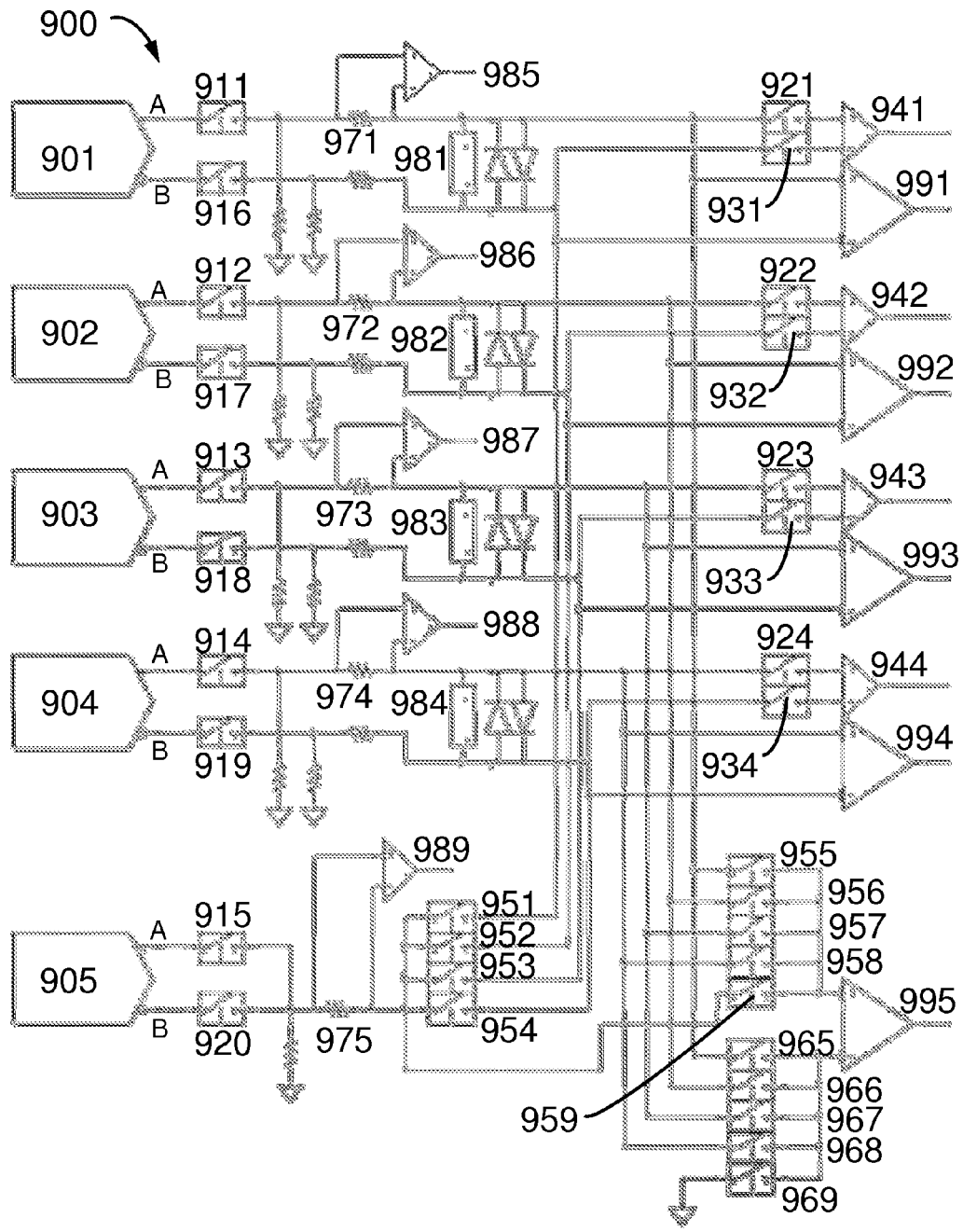
FIG. 9 is a schematic diagram of a circuit for parallel testing of multiple read heads in a TDMR slider in either a common lead or a separate lead electrical configuration.

FIG. 9 is a schematic diagram 900 of a circuit for parallel testing of multiple read heads in a TDMR slider in either a common lead or a separate lead electrical configuration. DACs 901-905 are analogous to DACs 301-305, however DACs 901-905 are configured with symmetrical opposite polarity outputs A and B (i.e., when output A is +4 V, then B will be −4 V, and if output A is −2 V, then B will be +2 V). Read heads 981-984 are analogous to heads 341-344. Current sense resistors 971-974 are analogous to resistors 331-334. Current sense amplifiers 985-988 are analogous to amplifiers 351-354. Output amplifiers 991-995 are analogous to amplifiers 361-365. High frequency preamps 941-944 are analogous to preamps 371-374. Relays 911-915 are analogous to relays 311-315. Relays 921-924 are equivalent to relays 381-384. To enable dc and high frequency testing of read heads with separate leads, relays 916-920, 931-934, 951-959, 965-969 have been added in comparison to circuit 300 in FIG. 3. Relays 951-954 are connected in common at "Node A", which also connects to the common current sense circuit comprising amplifier 989 and resistor 975. Relays 955-959 are connected in common at "Node B", which also connects to the positive input of amplifier 995. Relays 965-969 are connected in common at "Node C", which also connects to the negative input of amplifier 995.

Setting of Bias Currents or Voltages and DC Measurements in a Separate Lead Configuration.

When the following relay opens and closes are implemented, the circuit in FIG. 9 will enable parallel setting of bias currents and performing dc measurements for separate lead read heads 981-984:
Close relays: 911-919
Open relays: 921-924, 931-934, 951-954, 955-959, 965-969
This test arrangement separately biases each of the four read heads 981-984 [although one, two, or three read heads can be biased as well] using the symmetrical outputs A and B of DACs 901-904. The current through read head 981 is measured using amplifier 985 to measure the ohmic voltage drop across sense resistor 971, and similarly for read heads 982-984. The previously-measured leakage currents through the ESD diodes may be subtracted off the measured currents, based on the measured voltage across the read head, since these leakage currents bypass the read heads, but pass through the sense resistors.

Setting of Bias Currents or Voltages and DC Measurements in a Common Lead Configuration (Including for Separate Lead Read Heads).

When the following relay opens and closes are implemented, the circuit in FIG. 9 will enable parallel setting of bias currents and performing dc measurements for separate lead read heads 981-984 in the same way that the circuit in FIG. 3 did for common lead read heads 341-344 in FIG. 4A:
Close relays: 911-915, 951-954, 959, 969
Open relays: 916-920, 921-924, 931-934, 955-958, 965-968
This test arrangement provides some additional data about the performance of the multiple read heads in a TDMR slider, including measurements of the interactions between heads, such as leakage currents, etc.

Series DC Measurements in a Separate Lead Configuration.

When the following relay opens and closes are implemented, the circuit in FIG. 9 will enable dc measurements for two separate lead read heads 981 and 982 in series:
Close relays: 911, 912, 951-952, 959, 969
Open relays: 913-920, 921-924, 931-934, 953-954, 955-958, 965-968
Set V(901)=−V(902), i.e., the two DAC outputs are equal magnitude and opposite sign
This test arrangement provides some additional data about the performance of the neighboring read heads in a TDMR slider, including measurements of the interactions between heads, such as leakage currents, etc.

High Frequency Noise and Instability Measurements in a Separate Lead Configuration.

When the following relay opens and closes are implemented, the circuit in FIG. 9 will enable parallel measurement of high frequency noise and instability for read heads 981-984 in the same way that the circuit in FIG. 3 did using a common-lead circuit configuration for read heads 341-344 in FIG. 5B:
Close relays: 921-924, 931-934, 951-954
Open relays: 911-915, 916-920, 955-959, 965-969
This test arrangement allows the measurement of high frequency noise and instability using the preamps 941-944.

Measurement of Resistances Between Read Heads in a Slider.

When the following relay opens and closes are implemented, the circuit in FIG. 9 will enable of the resistances between read heads in a slider (in this example, heads 981 and 982)—this enables a detection of defective sliders. The method works by applying voltages to the two read heads, and then measuring the current and voltage difference between the heads—note that this is not measuring the resistance of either of heads 981 or 982, but rather the resistance between them within the slider structure:
Close relays: 911, 912, 955, 966
Open relays: 913-920, 921-924, 931-934, 951-954, 956-959, 965, 967-969
Set V(901)=−V(902), i.e., the two DAC outputs are equal magnitude and opposite sign
This test arrangement does not apply voltages across any read heads, but instead applies voltages to only one end of each of two read heads and then measures the current flowing and the voltage difference. In this example, amplifier 985 would measure the ohmic voltage drop across resistor 971 and amplifier 986 would measure the ohmic voltage drop across resistor 972—both these measurements should be comparable. The amplifier 995 measures the voltage difference between read heads 981 and 982. The resistance between heads 981 and 982 is then:

$$R(\text{leakage}) = V(995)/I(971)$$

where I(971)=V(985)/R(971).

Procedure for Sequentially Testing Multiple Sliders

Figure 10:
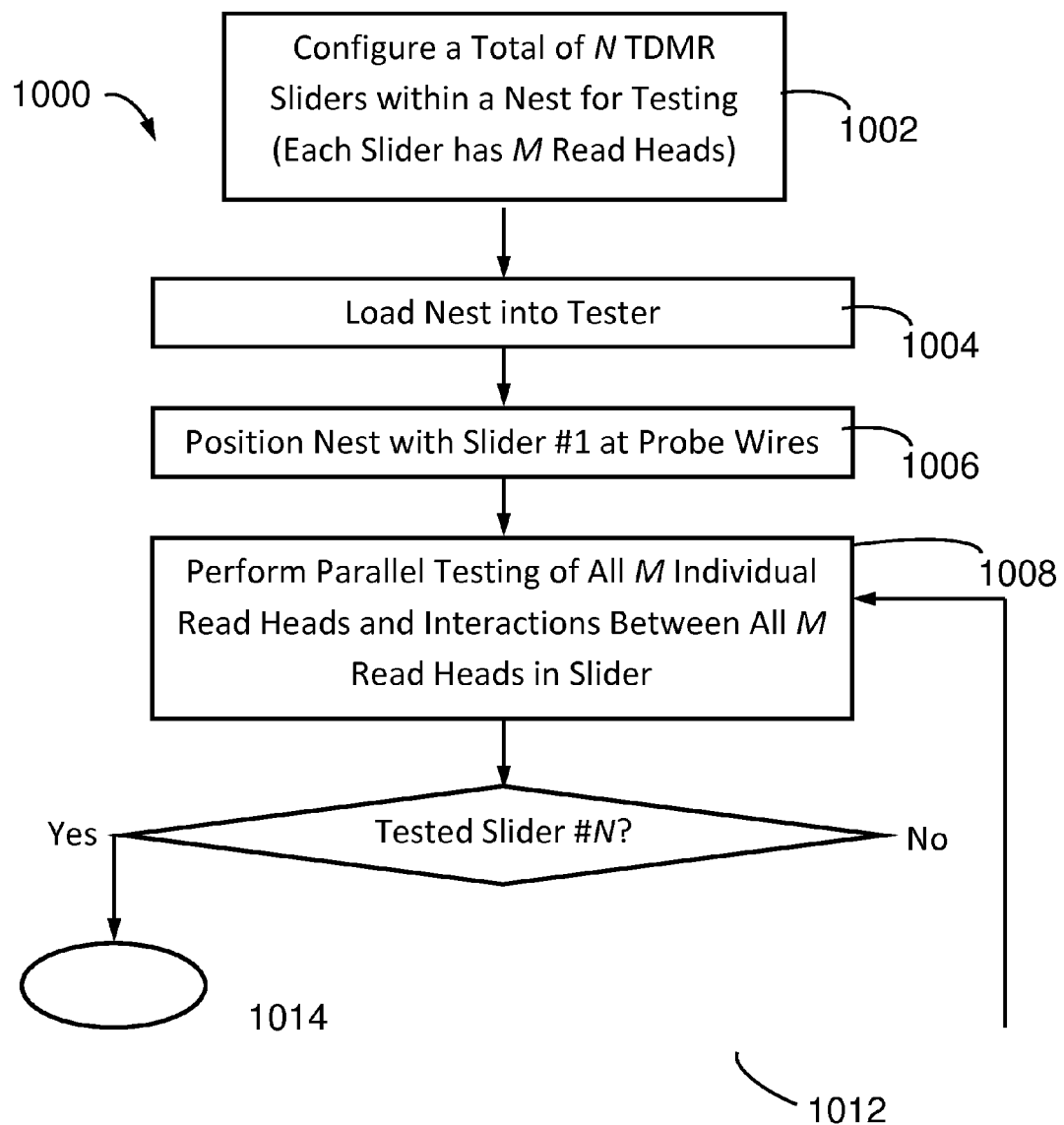
FIG. 10 is a flow chart of a procedure for sequentially testing a multiplicity of N sliders in a nest, wherein each slider has a plurality of M read heads.

FIG. 10 is a flow chart 1000 of procedure for sequentially testing a multiplicity of N sliders in a nest, where each slider has a plurality of M read heads. As discussed in the section "Testing Configuration for TDMR Read Heads", in some cases, N may be one slider, and in other cases, N may range up to approximately sixty sliders. The plurality of heads in each slider, M, may range from one (as in a non-TDMR slider) up to at least four (a TDMR slider with four read heads).

In block 1002, a nest (e.g., 104 in FIG. 1) for holding sliders or bars during testing is loaded with N sliders for testing. Next, in block 1004 the nest is loaded either manually or automatically into the tester between the pole pieces (e.g., 106 and 108 in FIG. 1) which will immerse the sliders in the nest in an approximately uniform magnetic field to simulate the magnetic field at the read head induced by the magnetization of the data storage medium (typically either a magnetic disk or magnetic tape).

In block 1006, the mechanical stage supporting the nest moves the nest into position so that the set of probe pins (one per pad on the slider) can electrically contact the pads on the slider.

In block 1008, parallel testing of the M individual heads on the slider is performed, as well as testing for interactions between the M heads. Examples of the kinds of tests performed are described in the following four sections.

[FIGS. 4A, 5A, 7, 9] Resistance Measurement.

This is a DC measurement of the resistance of all the slider transducer elements. This may include the read sensor, write coil, thermal fly-height control (TFC) heater, ECS (Electrical Contact Sensor), and other electrical elements. It may also include electrical isolation measurement between the elements. For the write coil, it may include an impedance (Inductance) measurement. For embodiments of this invention for TDMR, it will include making read sensor measurement on all the read elements at the same time (FIGS. 3-6). It may also include resistance measurements of two read sensors in series (FIGS. 7 and 8). Ideally the series measurement should sum to the individual measurements. If it does not, this indicates that there may be internal shunts (undesirable low resistance paths) between the heads. Also for differential TDMR lead design, the DC isolation between the different sensors will be measured.

[FIGS. 4A, 5A, 7, 9] Quasi Amplitude and Asymmetry.

This is a DC measurement, with the bias condition subtracted. The magnetic field is switched between a positive field, a negative field, and a zero state while measuring the head response. This may also include stress conditions, such as TFC and Write current. For embodiments of this TDMR invention, it will include making quasi measurements on all the read elements at the same time and checking that they are similar, and can also include making a quasi-series measurement on two sensors. Again, the amplitudes of the two sensors should sum together. If not, again this is an indication of shunting/defect occurring in the structure, which should be detected at test.

[FIGS. 4A, 5A, 7, 9] Transfer Curve and Kink.

This test is a DC magnetic field stepped in small increments to examine the linearity of the transfer curve. Again, this may contain stress conditions, such as TFC on during measurements (causing heating of the other elements in the slider). For TDMR, this test may include the same comparison algorithm, and series summing looking for defects.

[FIGS. 4B, 5B, 9] Noise and Instability Measurement.

This is an AC measurement, typically from low hundred kHz to 50 MHz or higher. The noise signal is captured from the head in a specified frequency range. The magnetic field may also be slowly swept (few hundred Hz, below the preamp range) to provide a stress. The signal capture can be done in either the frequency domain (using spectrum analyzer) or time domain with a high speed digitizer (like an oscilloscope). For time domain analysis, will capture noise on M heads simultaneously. The captured data is corrected for the preamp gain. From this data, many different parameters can be calculated. If the noise is pure random Gaussian, a noise value can be calculated, which can then be used in signal to noise (SNR) calculation. However, the noise can have structure, such as mode hopping between states. Many enhanced algorithms have been developed to extract information on unstable heads. For TDMR embodiments of the invention enable measurement of two or more heads at the same time. The individual noise components are measured as is currently done. However, embodiments of the invention also measure the coherent noise (i.e. noise that is the same) between heads.

Stress Conditions for the Measurements.

Some of the above measurements may contain stress conditions such as activating the Thermal Fly Height Control (TFC) [thermal stress], write current [magnetic domain stress] or Temperature [thermal stress].

Block 1010 determines if all the sliders in the nest have been tested already. If "No", the nest is moved in block 1012 to position the next slider for testing at the probe card wires. If "Yes", then "Done" block 1014 is entered.

TERMINOLOGY

In the above descriptions of embodiments of the invention, the term "digital-to-analog converter", or "DAC" is used to denote any type of programmable voltage supply. The term "relay" is used to denote any type of switching mechanism, including, but not limited to, relays, mechanical switches, pneumatic switches, CMOS switches, etc. The term "current sensing circuit" includes, but is not limited to a sense resistor in series with a read head, with a differential amplifier being connected across the sense resistor. The term "electrical connector" is synonymous with "probe wire" or "probe pin" for connecting to read head pads in the slider. Also note that a slider assembly may typically comprise one or more (for TDMR) read heads as well as a write coil, magnetic pole pieces, and in some embodiments thermal fly height control heaters, and optical waveguides or microwave sources.

ALTERNATIVE EMBODIMENTS

Although embodiments have been described in the context of hard disk drive testing structures and methods, it should be understood that various changes, substitutions and alterations can be made. Moreover, the scope of the present application is not intended to be limited to the particular embodiments of the process, machine, manufacture, or composition of matter, means, methods and steps described in the specification. As one of ordinary skill in the art will readily appreciate from the disclosure of embodiments, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A structure for parallel biasing and testing of a first plurality of read heads in a two dimensional magnetic recording slider, wherein the slider has a common lead wiring configuration, comprising:
   a second plurality of test circuits, wherein the second plurality is at least as large as the first plurality, wherein each test circuit is configured to test a single read head, and wherein each test circuit comprises:

a first connection to the read head, comprising a probe wire for connecting to a pad in the slider;
a programmable voltage source;
a current sensing circuit, electrically connected to the first connection to the read head;
a switching mechanism for connecting the programmable voltage source to the current sensing circuit; and
an amplifier for measuring the voltage across the read head, having positive and negative inputs, and wherein the positive input is connected to the first connection to the read head; and
a second connection, connecting in common all the negative inputs of the amplifiers in the second plurality of test circuits, and comprising a probe wire for connecting to a pad in the slider.

2. The structure of claim 1, wherein each test circuit further comprises:
a high frequency preamp; and
a preamp switching mechanism for connecting the preamp to the first connection to the read head.

3. The structure of claim 1, further comprising:
a common programmable voltage source;
a common current sensing circuit, connected to the second electrical connection; and
a common switching mechanism for connecting the common programmable voltage source to the common current sensing circuit.

4. The structure of claim 3, wherein in each test circuit:
the programmable voltage source comprises a digital-to-analog converter;
the current sensing circuit comprises a sense resistor and a differential amplifier with inputs connected to the two ends of the sense resistor; and
the switching mechanism comprises a relay; and wherein
the common programmable voltage source comprises a digital-to-analog converter;
the common current sensing circuit comprises a sense resistor and a differential amplifier with inputs connected to the two ends of the sense resistor; and
the common switching mechanism comprises a relay.

5. The structure of claim 1, wherein the plurality of test circuits comprises at least two test circuits.

6. The structure of claim 5, wherein the plurality of test circuits comprises four test circuits.

7. A method for parallel biasing and testing of a first plurality of read heads in a two dimensional magnetic recording slider, wherein the slider has a common lead wiring configuration, comprising the steps of:
configuring a structure for parallel biasing and testing of the first plurality of read heads comprising:
a second plurality of test circuits, wherein the second plurality is at least as large as the first plurality, wherein each test circuit is configured to test a single read head, and wherein each test circuit comprises:
a first connection to the read head, comprising a probe wire for connecting to a pad in the slider;
a programmable voltage source;
a current sensing circuit, electrically connected to the first connection to the read head;
a switching mechanism for connecting the programmable voltage source to the current sensing circuit; and
an amplifier for measuring the voltage across the read head, having positive and negative inputs, and wherein the positive input is connected to the first connection to the read head; and
a second connection, connecting in common all the negative inputs of the amplifiers in the second plurality of test circuits, and comprising a probe wire for connecting to a pad in the slider;
connecting each read head in the first plurality of read heads to the first and second connections in a test circuit in the second plurality of test circuits; and
for each test circuit which is connected to a read head:
connecting the programmable voltage source using the switching mechanism;
programming the programmable voltage source to achieve a desired bias on the read head; and
testing the read head using the output signal from the amplifier.

8. The method of claim 7, wherein each test circuit further comprises:
a high frequency preamp;
a preamp switching mechanism for connecting the preamp to the first connection to the read head; and
for each test circuit which is connected to a read head, further comprising the steps of:
disconnecting the programmable voltage source from the read head using the switching mechanism;
connecting the preamp to the first connection to the read head using the preamp switching mechanism;
biasing the read head using the preamp; and
performing high frequency noise and instability testing of the read head using the preamp.

9. The method of claim 7, wherein each test circuit further comprises a pair of opposite polarity diodes connected between the current sensing circuit of each test circuit and the common current sensing circuit.

10. The method of claim 9, further comprising a procedure for measuring the leakage currents through the diodes, wherein the procedure comprises the steps of:
prior to the step of connecting the test circuit to a read head,
connecting the common programmable voltage source using the common switching mechanism;
for each test circuit, performing the steps of:
connecting the programmable voltage source using the switching mechanism;
varying the voltage setting on the programmable voltage source while measuring and recording the current as a function of the voltage setting using the current sensing circuit; and
disconnecting the programmable voltage source using the switching mechanism.

11. The method of claim 7, wherein the structure for parallel biasing and testing further comprises:
a common programmable voltage source;
a common current sensing circuit, electrically connected to the common connection of all the second electrical connections to the read heads; and
a common switching mechanism for connecting the common programmable voltage source to the common current sensing circuit.

12. The method of claim 11, wherein in each test circuit:
the programmable voltage source comprises a digital-to-analog converter;
the current sensing circuit comprises a sense resistor and a differential amplifier with inputs connected to the two ends of the sense resistor; and
the switching mechanism comprises a relay; and wherein
the common programmable voltage source comprises a digital-to-analog converter;

the common current sensing circuit comprises a sense resistor and a differential amplifier with inputs connected to the two ends of the sense resistor; and the common switching mechanism comprises a relay.

13. The method of claim 7, wherein testing the read head comprises measuring the resistance of the read head as a function of magnetic field strength.

14. The method of claim 7, wherein testing the read head comprises measuring the Quasi amplitude and asymmetry.

15. The method of claim 7, wherein testing the read head comprises measuring the transfer curve and kink.

16. A method for biasing and testing a multiplicity of sliders, wherein each slider comprises a plurality of read heads, comprising the steps of:
configuring a nest to contain the multiplicity of sliders;
configuring a structure for parallel biasing and testing of the plurality of read heads within each slider in the multiplicity of sliders;
loading the nest into the testing structure;
positioning the nest to enable electrical connection of the all the read heads in a first slider in the nest to the test circuits;
biasing and testing all the read heads in the plurality of read heads in the first slider in parallel using the test circuits;
repositioning the nest to enable electrical connection of a next slider in the nest to the test circuits; and
biasing and testing all the read heads in the plurality of read heads in the next slider in parallel using the test circuit; and
repeating the steps of repositioning, biasing and testing until all the sliders in the nest have been biased and tested.

17. A structure for parallel biasing and testing of a first plurality of read heads in a two dimensional magnetic recording slider, wherein the slider has a separate lead wiring configuration, comprising:
a second plurality of test circuits, wherein the second plurality is at least as large as the first plurality, wherein each test circuit is configured to test a single read head, and wherein each test circuit comprises:
first and second connections to the read head, each comprising a probe wire for connecting to a pad in the slider;
a programmable voltage source, having symmetrical opposite polarity outputs A and B;
a current sensing circuit, electrically connected to the first connection to the read head;
switching mechanism A for connecting output A of the programmable voltage source to the current sensing circuit;
switching mechanism B for connecting output B of the programmable voltage source to the second connection to the read head;
an amplifier for measuring the voltage across the read head, having positive and negative inputs, wherein the positive input is connected to the first connection to the read head, and wherein the negative input is connected to the second connection to the read head;
a high frequency preamp, having first and second inputs;
first and second preamp switching mechanisms for connecting the first and second inputs of the preamp to the first and second connections to the read head, respectively; and
a third switching mechanism for connecting the second connection to the read head to a node A; and fourth and fifth switching mechanisms for connecting the first connection to the read head to nodes B and C, respectively;
a common programmable voltage source, having symmetrical opposite polarity outputs A and B;
common switching mechanisms A and B for connecting outputs A and B of the common programmable voltage source to a common current sensing circuit, respectively;
a connection between the common current sensing circuit and node A; and
a common amplifier, having positive and negative inputs, connected to nodes B and C, respectively.

18. The structure of claim 17, wherein in each test circuit:
the programmable voltage source comprises a digital-to-analog converter;
the current sensing circuit comprises a sense resistor and a differential amplifier with inputs connected to the two ends of the sense resistor; and
the switching mechanism comprises a relay; and wherein
the common programmable voltage source comprises a digital-to-analog converter;
the common current sensing circuit comprises a sense resistor and a differential amplifier with inputs connected to the two ends of the sense resistor; and
the common switching mechanism comprises a relay.

19. The structure of claim 17, wherein the plurality of test circuits comprises at least two test circuits.

20. The structure of claim 19, wherein the plurality of test circuits comprises four test circuits.

21. A method for parallel biasing and testing of a plurality of read heads, comprising the steps of:
configuring a structure for parallel biasing and testing of the plurality of read heads comprising:
a second plurality of test circuits, wherein the second plurality is at least as large as the first plurality, wherein each test circuit is configured to test a single read head, and wherein each test circuit comprises:
first and second connections to the read head, each comprising a probe wire for connecting to a pad in the slider;
a programmable voltage source, having symmetrical opposite polarity outputs A and B;
a current sensing circuit, electrically connected to the first connection to the read head;
switching mechanism A for connecting output A of the programmable voltage source to the current sensing circuit;
switching mechanism B for connecting output B of the programmable voltage source to the second connection to the read head;
an amplifier for measuring the voltage across the read head, having positive and negative inputs, wherein the positive input is connected to the first connection to the read head, and wherein the negative input is connected to the second connection to the read head;
a high frequency preamp, having first and second inputs;
first and second preamp switching mechanisms for connecting the first and second inputs of the preamp to the first and second connections to the read head, respectively; and
a third switching mechanism for connecting the second connection to the read head to a node A;

fourth and fifth switching mechanisms for connecting the first connection to the read head to nodes B and C, respectively;
a common programmable voltage source, having symmetrical opposite polarity outputs A and B;
common switching mechanisms A and B for connecting outputs A and B of the common programmable voltage source to a common current sensing circuit, respectively;
a connection between the common current sensing circuit and node A; and
a common amplifier, having positive and negative inputs, connected to nodes B and C, respectively;
connecting the outputs A and B of the programmable voltage source in every test circuit which is connected to a read head using the switching mechanisms A and B, respectively;
programming the programmable voltage sources in each test circuit to achieve the desired bias on each read head;
measuring the voltage across the read heads in each test circuit using the amplifiers in each test circuit; and
performing dc testing of each read head using the voltages measured across the read heads using the amplifiers in each test circuit.

22. The method of claim 21, wherein in each test circuit:
the programmable voltage source comprises a digital-to-analog converter;
the current sensing circuit comprises a sense resistor and a differential amplifier with inputs connected to the two ends of the sense resistor; and
the switching mechanism comprises a relay; and wherein the common programmable voltage source comprises a digital-to-analog converter;
the common current sensing circuit comprises a sense resistor and a differential amplifier with inputs connected to the two ends of the sense resistor; and
the common switching mechanism comprises a relay.

23. The method of claim 21, wherein each test circuit further comprises a pair of opposite polarity diodes connected between the first and second connections to the read head.

24. The method of claim 23, further comprising a procedure for measuring the leakage currents through the diodes, wherein the procedure comprises the steps of:
prior to the step of connecting the test circuits to read heads,
in each test circuit:
connecting output A of the programmable voltage source using switching mechanism A to the current sensing circuit;
connecting output B of the programmable voltage source using switching mechanism B to the second connection to the read head; and
varying the voltage settings on the programmable voltage source while measuring and recording the current as a function of the applied voltage using the current sensing circuit.

25. The method of claim 21 wherein the plurality of read heads is comprised within a single slider.

26. The method of claim 21 wherein each read head in the plurality of read heads is comprised within a separate slider within a row bar.

27. The method of claim 21 wherein the plurality of read heads may be comprised within multiple sliders within a row bar.

* * * * *